Feb. 20, 1962     J. D. GOODELL ET AL     3,021,611
METHOD AND APPARATUS FOR TEACHING
PHYSIOLOGICAL SELECTION SKILLS
Filed May 12, 1960

INVENTORS
JOHN D. GOODELL
EDWIN F. SHELLEY
BY
ATTORNEYS

3,021,611
METHOD AND APPARATUS FOR TEACHING PHYSIOLOGICAL SELECTION SKILLS
John D. Goodell, Silver Spring, Md., and Edwin F. Shelley, New Rochelle, N.Y., assignors to U.S. Industries, Inc., New York, N.Y., a corporation of Delaware
Filed May 12, 1960, Ser. No. 28,726
6 Claims. (Cl. 35—6)

This invention relates to a method and apparatus for training a human trainee to selectively actuate the keys of a finger-keyboard apparatus and more particularly to a method and apparatus for training a trainee to selectively actuate the keys of a finger-keyboard by conditioned reflex action of the trainee's fingers in response to observable symbolic stimuli presented to the trainee.

In order to provide sufficient personnel for modern automated offices and plants, increasing numbers of operators must be trained to operate finger-keyboards and similar devices which are adapted to control or program machines or to convert information from one form to another.

The general difficulties of teaching a person to operate a conventional finger-keyboard instrument by experimental trial and error methods are well known. The learning process is usually a long and tedious one and the end performance quality level is generally unpredictable. The average trainee makes many errors in the course of learning to operate a keyboard instrument. There is reason to believe that the error patterns experienced during the course of learning by this method are never completely eliminated from the human neuro-muscular system and that they are, to a large degree, responsible for subsequent random performance errors made by the operator, especially during intervals of operational stress. Accordingly, it is of great importance to reduce the number of errors experienced by the trainee during the training interval to a minimum in order to achieve the maximum in trainee operating efficiency and accuracy.

In certain special types of keyboard instruments, the operator is required to depress combinations of keys to effect a coding operation. For example, in certain types of semi-automatic mail-sorting apparatus used in post offices, an operator is required to read the address on each piece of incoming mail and rapidly depress a predetermined combination of keys on a keyboard which effectively provides a coded address for each piece of mail. Thereafter the mail is sorted automatically by a machine which observes the code accompanying each piece of mail and delivers it to the proper bin. The effective sorting accuracy and speed which can be achieved by such machines is substantially limited by the accuracy and speed with which the human operator can actuate the coding keyboard. In the normal course of operation of such machines, the operator has no way of visually monitoring the accuracy of his coding operation since the codes keyed into the machine are stored electrically or mechanically during the delivery cycle and then erased. As a consequence of this blind type of operation, the keyboard operator has no opportunity to progressively improve the accuracy of his performance by detecting and correcting errors (e.g., as a typist does). It is of utmost importance, therefore, that the operators of such machines be initially trained to perform with great proficiency.

Systems which have been proposed in the prior art for instructing trainees to operate keyboard instruments have generally employed simple indicator devices to warn the trainee or the instructor of produced errors. Clearly such systems still rely on the trial and error method of training the keyboard operator and hence they suffer from the same general shortcomings referred to above.

It is a principal object of the present invention to provide a novel method and apparatus for efficiently training a human trainee to actuate the keys on a keyboard instrument by reflex action of finger muscles.

In accordance with the invention, a training keyboard is provided having a plurality of finger-operated keys (or equivalent levers, buttons, etc.) which correspond to the keyboard of the machine to be operated by the trained operator. The output function of each key has a given intelligence symbol significance. Keyboard exercise instructions are presented to the trainee either orally (e.g., recorded voice) or visually (optical image) or both at a controlled rate. The presentation of instructions to the trainee will generally be referred to hereafter as the presentation of symbolic stimuli or conditioned stimuli to the trainee. The symbolic or conditioned stimuli may in certain instances correspond directly to a specific pattern of keys to be depressed. In other instances no such direct correspondence will obtain; rather the trainee will be required, for example, to operate a combination of numbered keys, in response to the presentation of a word symbol such as the name of a city or a street address. In accordance with a featured aspect of the invention the learning process of the trainee is implemented by physically displacing the keys to be operated in a reverse direction. The physical displacement of the keys will be referred to hereinafter as the presentation of natural stimuli or unconditioned stimuli to the trainee. In accordance with the teachings of the invention a natural stimulus is presented to the desired finger or combination of fingers in timed relationship with the presented symbolic stimulus. Experimental tests have indicated that the initial presentation of the natural stimulus to the trainee's fingers should be delayed with reference to the initial presentation of the symbolic stimulus.

In a preferred embodiment of the invention the natural stimulus is presented to the fingers associated with the correct keys to be depressed by momentarily displacing the keys upwardly against the operator's fingers in a direction opposite to that for normal operation. This stimulus produces a resistive reflex action in the muscles of the fingers associated with the keys to be depressed. As a consequence, the correct keys are depressed in the normal operating direction by the elicited resistive reflex action of the finger muscles. The natural reflex actions of the finger muscles are conditioned to actuate appropriate keys on the keyboard by repeated presentations of the symbolic stimuli sequentially combined with the natural stimuli. After the reflex conditioning is complete, the natural stimuli is removed and the trainee is prepared to operate a standard keyboard instrument by conditioned or learned reflex action.

It should be appreciated by those skilled in the psychology of learning that the method and apparatus of teaching keyboard skills provided by the invention affords a notable advance in efficiency over known existing systems. Since the trainee is caused to advance through a prescribed training program learning only the correct keyboard operations, making substantially no errors, the reliability and accuracy of performance achieved by the trainee are greatly enhanced over and above that achieved by conventional trial and error training techniques.

The invention will be further described in connection with the accompanying drawings which show a single embodiment thereof.

Figure 1:
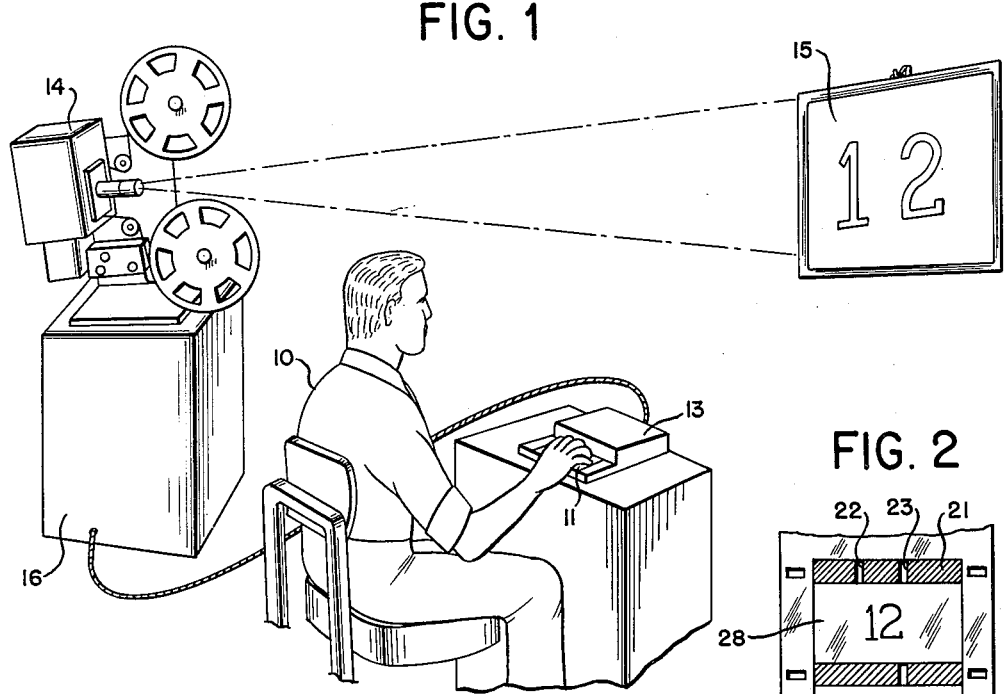
FIG. 1 shows a trainee operating a training keyboard apparatus provided by the invention.

Referring to FIG. 1 there is shown generally a trainee 10 actuating the keys 11 on a training keyboard instrument 13. Projector 14 is provided to present a series of visual images (symbolic stimuli) to the trainee on screen 15. Control signals for the projector and the training keyboard are provided by a timing cycle control device shown generally at 16. The trainee's fingers are disposed in a natural rest position in contact with the tops of the keys to be depressed. Each key of the training keyboard corresponds to a key of the standard keyboard which the trainee is being taught to operate. The timing cycle control device is adapted to advance the film in the projector one frame at a time to present the desired sequential series of instructions to the trainee as to the proper keys to be depressed. Control signals are produced in timed relation with the projection of each film frame for momentarily displacing those keys to be depressed upwardly against the trainee's fingers resting thereon. Upward displacement of the proper keys (reverse direction of normal operating direction) to be depressed elicits a natural reflex action of the muscles in the fingers resting on those keys. The elicited natural reflex action in the finger muscles, resisting the upward movement of the keys, is in the desired downward direction for correct operation of the keys. The visual image (symbolic stimulus) is advantageously presented to the trainee first, with the natural stimulus being presented shortly thereafter. It should be noted that the relative timing of the stimulus presentations is very important to the process of implanting conditioned reflexes in the trainee. Experimental tests indicate that the time delay between the initial presentation of the symbolic stimulus and the natural stimulus should be in the range of one-half second. This time delay is an important aspect of the reflex conditioning and also affords the trainee sufficient time to recognize the image before the natural stimulus is presented. Thus it will be seen that with repeated sequential presentations of the symbolic stimuli with the natural stimuli, the trainee is taught to operate the training keyboard instrument by conditioned reflex action of the finger muscles. Since substantially no errors are made by the trainees during the training program, an ultimate keyboard operating performance level of high accuracy is reached by each trainee in a relatively short amount of time.

Figure 2:
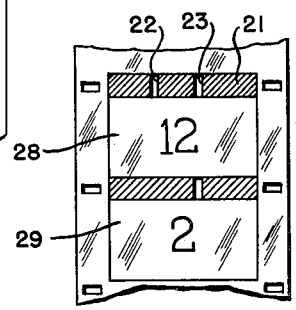
FIG. 2 is a fragmentary drawing showing a pair of film frame images along with associated coded control signal tracks.
Figure 3:
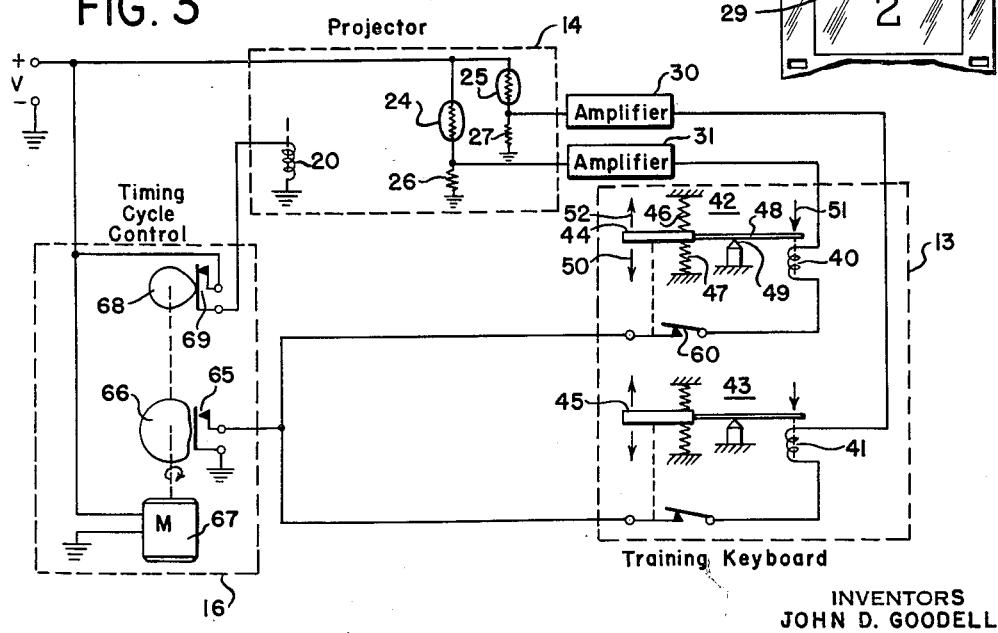
FIG. 3 is a simplified schematic diagram showing training keyboard control circuits in accordance with the general teachings of the invention.

The simplified schematic diagram of FIG. 3 shows one example of simple electro-mechanical control circuits which may be employed to control the film projector and training keyboard shown generally in FIG. 1. For purposes of explanatory simplification the control circuits for only two keys are shown. The intelligence symbols assigned to the two keys are the numbers one and two, respectively, and it is assumed that the operator is required to selectively depress one or both of these keys in response to the arndom visual presentation of these numbers by the projector. The projector shown in FIG. 1 is a strip film projector which is adapted to project one frame at a time on a slow intermittent basis. A solenoid 20 is provided to actuate a claw pull-down device (not shown) which advances the strip film one frame at a time each time the solenoid is energized. The desired training sequence of numbers or combination of numbers is presented on successive frames of the strip film as shown in FIG. 2. In addition to the visual symbolic image, each frame also has an area 21 which carries an optical binary code corresponding to the key numbers carried on the frame. Area 22, when transparent as shown, permits light to pass through the film indicating the presence of number 1 on the frame. When the area is dark (high density), absence of number 1 is indicated. In like manner area 23 indicates the presence or absence of number 2 in the image area.

Photo-conductive cells 24 and 25 electrically energized by voltage V are provided to sense the transmission of light through 22 and 23, respectively, and accordingly generate control signals across resistors 26 and 27, respectively, in response to the detected light. Thus when frame 28 is in the projector gate, control signals will be developed across both 26 and 27, but when frame 29 is in the gate, a control signal will be produced across resistor 27 only.

The control signals produced across resistors 26 and 27 are amplified by amplifiers 31 and 30, respectively, and employed to energize solenoids 40 and 41, respectively, associated with key mechanisms 42 and 43, respectively. Solenoids 40 and 41, when energized by the respective amplified control signals, provide the natural stimuli to the trainee's fingers resting on the surfaces of the operating key members 44 (number 1) and 45 (number 2). Each key member is maintained in a normal rest position by spring members 46 and 47. A compliant member 48 is provided to couple 44 to solenoid 40 and the entire key assembly is adapted to pivot on knife edge 49. The normal operating direction of the keys is downward as indicated by arrow 50. When solenoid 40 is energized by a control signal from photo cell 24, member 48 is pulled downwardly as indicated by arrow 51 and 44 is displaced upwardly against the trainee's finger as indicated by arrow 52. The upward displacement of the key elicits a natural resistive reflex action in the finger muscles of the trainee which causes the key to be depressed downwardly opening the normally closed contacts of switch 60 which are connected in series with the ground return for solenoid 40 as shown.

The normally open contacts of switch 65, which forms a part of the simple timing cycle control mechanism, are connected in series with the ground returns of solenoids 40 and 41. Thus neither solenoid can be energized by a photo-cell control signal until switch 65 is closed by cam 66 which is driven by motor 67. In the normal course of operation the timing motor causes solenoid 20 to be momentarily energized by rotating cam 68 against the normally open contacts of switch 69. Closing of switch 65 is delayed with respect to the closing of switch 69 due to the selected shape of cam 66 and the relative angular dispositions of the two cams on the common drive shaft. Cam 66 is angularly oriented on the drive shaft so that switch 65 will be initially closed approximately one-half second after the closing of switch 69. Thus the initial presentation of the natural stimulus to the trainee's fingers will be properly delayed as described above. Cam 66 is advantageously shaped as shown so that switch 65 will be held closed during the presentation of each visual image to the trainee. Thus the proper keys to be depressed by the trainee will be held in the upward position by the solenoids until shortly before a new frame is advanced in the projector by the actuation of switch 69 by cam 68. Proper downward actuation of the key by the trainee, before switch 65 is opened, opens switch 60 and relaxes solenoid 40. The shaft rotational speed of the simple motor driven timing cycle control is advantageously made adjustable to afford a range in frame rate presentation varying between approximtaely 6 frames per minute up to 120 frames per minute. The angular orientation of cam 66 with respect to cam 68 is advantageously made adjustable to afford a time delay which can be varied between a minimum of approximately 0.25 second and a maximum of approximately 5 seconds.

It will be appreciated by those skilled in the art that the single apparatus embodiment shown in the drawings and described above is but one of many possible arrangements that may be successfully employed to practice the general method of teaching key selection skills provided by the invention. As such the exemplary embodiment is not to be construed as limitative in any respect. For example, equivalent arrangements employing automatic slide projectors with coded slides, or conventional motion picture projectors with time delayed optical or magnetic tracks for producing control signals may be used to practice the invention. In certain instances the user may find it advantageous to present observable symbolic stimuli aurally to the trainee or in combination with the visual presentation. Combination systems providing time synchronized presentations of related visual and aural information are well known in the art and will not be described herein.

It should be noted that the teaching method and apparatus provided by the present invention affords no positive mechanical assistance to the trainee's fingers. Instead known existing natural reflexes in the trainee's fingers are mechaically elicited or stimulated to respond to the presentation of observable stimuli corresponding to desired acts to be performed (i.e., depression of selected keys). After the reflexes are properly conditioned in accordance with the teachings of the invention, the trainee is then prepared to operate the same keyboard on a working machine with great speed and accuracy. The learned reflexes of the finger muscles are reinforced by operating against the normal displacement and terminal mechanical resistance of the keys and hence are preserved as a substantially permanent pattern in the trainee's neuro-muscular system.

The teaching method and apparatus provided by the present invention affords a noteworthy advantage in training keyboard operators to convert information from one form to another. In the operation of certain mail-sorting machines, for example, the operator must read an address and rapidly convert it to a code number equivalent. Following conventional training methods, the trainee must ordinarily be taught to perform the operation in two steps. The first step involves teaching the trainee to depress the correct combinations of keys in response to presented number exercises, and the second step involves teaching the trainee to translate presented word symbols or the like to proper number combinations. Following the general teachings of this invention the trainee is efficiently trained to perform the translation and keying operation in one step by conditioned reflex action.

We claim:

1. Apparatus for training a human trainee to selectively operate the keys of a finger-keyboard apparatus by producing a conditioned reflex action of the trainee's fingers in response to visual symbolic stimuli exhibited to the trainee, comprising a keyboard including a plurality of keys each having a symbolic output significance and each being adapted to be finger operated by said trainee, means for sequentially exhibiting to said trainee visual symbolic stimuli related to the keyboard output symbols, means for producing electrical control signals corresponding to visual symbols exhibited to the trainee, each of said control signals being produced in timed relation with the exhibited symbolic stimuli, and a plurality of electro-mechanical actuating means, one for each key, actuated by said control signals to momentarily displace each key to be operated by said trainee in a direction opposite to that required in normal operation, whereby the muscles in the trainee's finger in contact with a displaced key are provided with a natural physical stimulus accompanied by an associated visual stimulus exhibited to said trainee, thereby facilitating the conditioning of finger reflex action for the operation of said keys.

2. Apparatus for training a human trainee to selectively operate the keys of a keyboard apparatus by producing a conditioned reflex action of the trainee's fingers in response to aural stimuli presented to the trainee, comprising a keyboard including a plurality of keys each having a symbolic output significance and each being adapted to be finger operated by said trainee, means for sequentially presenting to said trainee aural stimuli related to the keyboard output symbols, means for producing electrical control signals corresponding to said presented aural stimuli, each of said control signals being produced in timed relation with the presented aural stimuli, and a plurality of electromechanical operating means, one for each key, actuated by said control signals to momentarily displace each key to be operated by said trainee in a direction opposite to that required in normal operation, whereby the muscles in the trainee's finger in contact with a displaced key are provided with a natural physical stimulus accompanied by an associated aural stimulus presented to said trainee, thereby facilitating the conditioning of finger reflex action for the operation of said keys.

3. Apparatus for conditioning a human trainee to selectively operate by reflex action the elements in an array of selectively operable mechanical elements, each element therein being adapted to be operatively moved in a predetermined direction by the trainee, with means for sequentially presenting to said trainee perceivable stimuli, each discrete stimulus in a presented sequence having a significance associated with a particular one of said selectively operable mechanical elements, means for momentarily producing a relative displacement between the particular element having a significance associated with each discrete stimulus presented and others of said elements, and means for producing a predetermined time delay between the operation of said stimulus presenting means and the operation of said element displacing means, whereby the relative displacement of the particular element and others of said elements is effected in delayed time relation with respect to the presentation of the corresponding perceivable stimulus.

4. Apparatus for conditioning a human trainee to selectively operate by reflex action the elements in an array of selectively operable mechanical elements comprising an array of mechanical elements, each element therein being adapted to be operatively moved in a predetermined direction by the trainee, with means for sequentially presenting to said trainee perceivable stimuli, each discrete stimulus in a presented sequence having a significance associated with a particular group of said selectively operable mechanical elements, means for momentarily producing a relative displacement between the particular group of elements having a significance associated with each discrete stimulus presented and the remainder of said elements, and means for producing a predetermined time delay between the operation of said stimulus producing means and the operation of said element displacement means, whereby the relative displacement of the particular group of elements and others of said elements is effected in delayed timed relation with respect to the presentation of the corresponding perceivable stimulus.

5. The method of conditioning a human trainee to selectively operate by reflex action the elements in an array of selectively operable mechanical elements which comprises, assigning a different symbolic significance to each of the plurality of mechanical elements to be operated by said trainee, sequentially presenting to said trainee perceivable symbolic stimuli corresponding to the proper elements to be operated by said trainee, and momentarily displacing each element to be operated in a direction opposite to that required in normal operation, the displacement of each element being delayed by a predetermined time interval with respect to the presentation of the corresponding perceivable symbolic stimulus.

6. The method of conditioning a human trainee to selectively operate by reflex action the elements in an array of selectively operable mechanical elements which comprises, assigning a different symbolic significance to each of the plurality of mechanical elements to be operated by said trainee, sequentially presenting to said trainee perceivable symbolic stimuli corresponding to the proper elements to be operated by said trainee, and momentarily producing a relative displacement between the element to be operated and others of said elements, said relative displacement being delayed by a predetermined time interval with respect to the presentation of the corresponding symbolic stimulus.

References Cited in the file of this patent

UNITED STATES PATENTS

| | | |
|---|---|---|
| 698,114 | Herlt | Apr. 22, 1902 |
| 823,362 | Powel et al. | June 12, 1906 |
| 2,060,974 | Buckley | Nov. 17, 1936 |
| 2,154,478 | Smith | Apr. 18, 1939 |
| 2,312,138 | Watson | Feb. 23, 1943 |